United States Patent
Kim et al.

(10) Patent No.: US 10,390,352 B2
(45) Date of Patent: Aug. 20, 2019

(54) METHOD AND APPARATUS FOR TRANSMITTING AND RECEIVING DOWNLINK CHANNEL STATE INFORMATION IN A MOBILE COMMUNICATION SYSTEM

(71) Applicant: Samsung Electronics Co., Ltd., Gyeonggi-do (KR)

(72) Inventors: Youn-Sun Kim, Gyeonggi-do (KR); Ki-Il Kim, Gyeonggi-do (KR); Ju-Ho Lee, Gyeonggi-do (KR); Hyo-Jin Lee, Gyeonggi-do (KR); Joon-Young Cho, Gyeonggi-do (KR); Seung-Hoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 276 days.

(21) Appl. No.: 14/349,875

(22) PCT Filed: Oct. 5, 2012

(86) PCT No.: PCT/KR2012/008080
§ 371 (c)(1),
(2) Date: Apr. 4, 2014

(87) PCT Pub. No.: WO2013/051886
PCT Pub. Date: Apr. 11, 2013

(65) Prior Publication Data
US 2014/0269596 A1  Sep. 18, 2014

(30) Foreign Application Priority Data
Oct. 7, 2011 (KR) .................. 10-2011-0102670

(51) Int. Cl.
*H04W 72/08* (2009.01)
*H04B 7/06* (2006.01)
*H04W 72/04* (2009.01)

(52) U.S. Cl.
CPC ............ *H04W 72/085* (2013.01); *H04B 7/06* (2013.01); *H04B 7/063* (2013.01); *H04B 7/0626* (2013.01);
(Continued)

(58) Field of Classification Search
None
See application file for complete search history.

(56) References Cited

U.S. PATENT DOCUMENTS

2008/0013610 A1\* 1/2008 Varadarajan ......... H04B 7/0417
375/221
2010/0271968 A1  10/2010 Liu et al.
(Continued)

FOREIGN PATENT DOCUMENTS

KR  1020090071301  7/2009

OTHER PUBLICATIONS

European Search Report dated Aug. 27, 2015 issued in counterpart application No. 12837957.5-1852, 9 pages.
(Continued)

*Primary Examiner* — Ayaz R Sheikh
*Assistant Examiner* — Mariela Vidal Carpio
(74) *Attorney, Agent, or Firm* — The Farrell Law Firm, P.C.

(57) ABSTRACT

Disclosed is a method and apparatus for transmitting channel state information (CSI) by a user equipment in a mobile communication system. The method includes receiving a CSI-reference signal (CSI-RS) for measuring a state of a downlink channel and a CSI feedback-related configuration from a base station (BS); determining a channel quality indication (CQI) for at least one transmission point and control information for determining a CQI for multiple transmission points, based on the received CSI-RS and CSI feedback-related configuration; and transmitting the deter- (Continued)

mined CQI for the at least one transmission point and control information to the BS.

17 Claims, 9 Drawing Sheets

(52) U.S. Cl.
CPC ......... *H04B 7/0632* (2013.01); *H04B 7/0639* (2013.01); *H04W 72/042* (2013.01)

(56) References Cited

U.S. PATENT DOCUMENTS

| | | |
|---|---|---|
| 2010/0278136 A1 | 11/2010 | Oymen et al. |
| 2010/0309996 A1* | 12/2010 | Lim ................. H04B 7/024 |
| | | 375/260 |
| 2010/0322176 A1* | 12/2010 | Chen ................. H04B 7/024 |
| | | 370/329 |
| 2011/0019613 A1 | 1/2011 | Han et al. |
| 2011/0080901 A1 | 4/2011 | Lin et al. |
| 2011/0141987 A1 | 6/2011 | Nam et al. |
| 2011/0207487 A1 | 8/2011 | Yang et al. |
| 2012/0088533 A1* | 4/2012 | Khoshnevis .......... H04L 1/0026 |
| | | 455/509 |
| 2013/0044685 A1* | 2/2013 | Fong ................... H04J 11/0053 |
| | | 370/328 |

OTHER PUBLICATIONS

PCT/ISA/237 Written Opinion issued on PCT/KR2012/008080 (pp. 4).
PCT/ISA/210 Search Report issued on PCT/KR2012/008080 (pp. 3).

* cited by examiner

[Fig. 1]
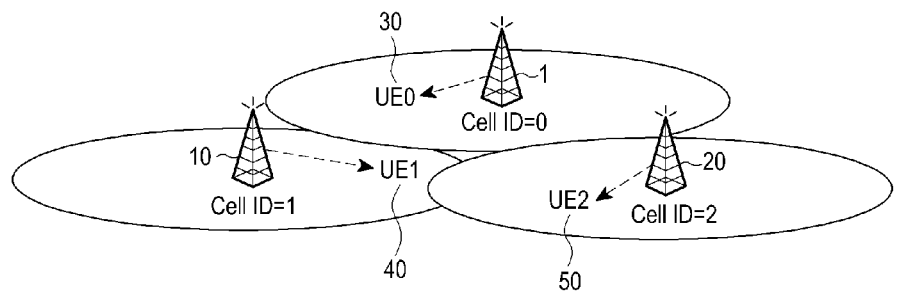
[Fig. 2]
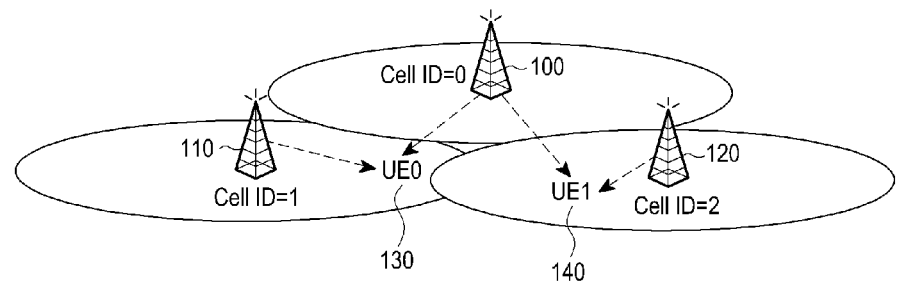
[Fig. 3]
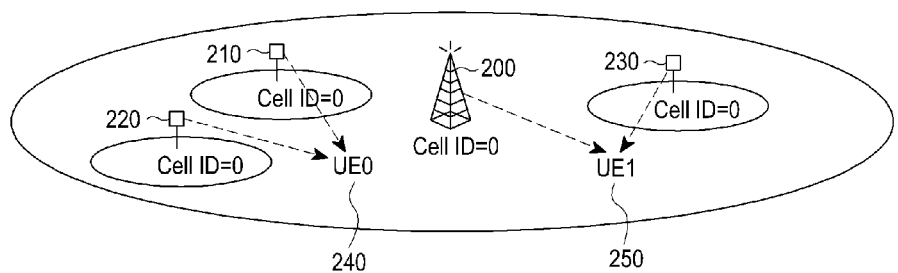

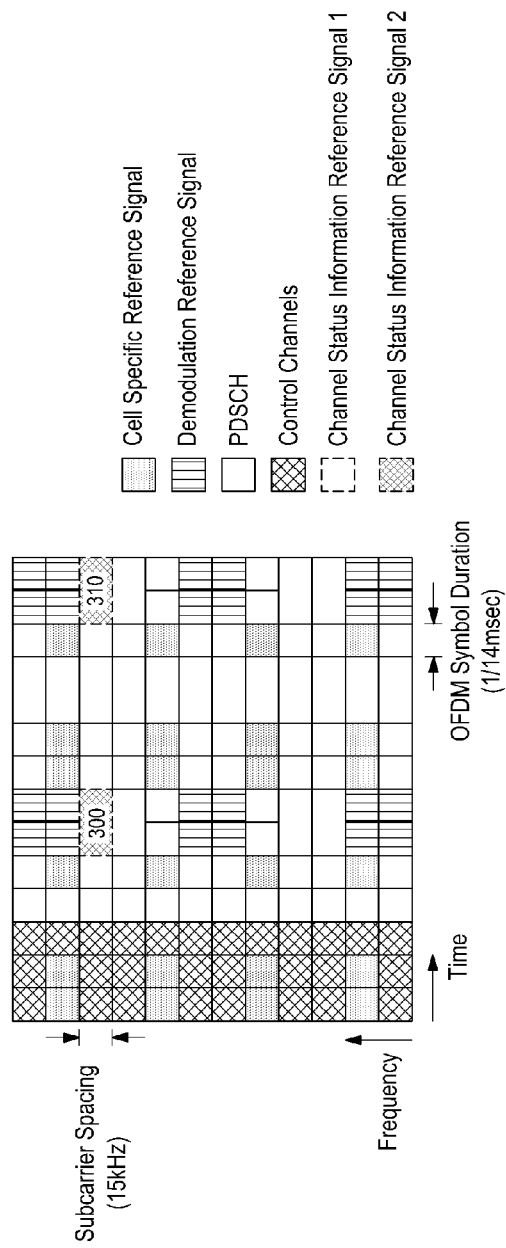
[Fig. 4]

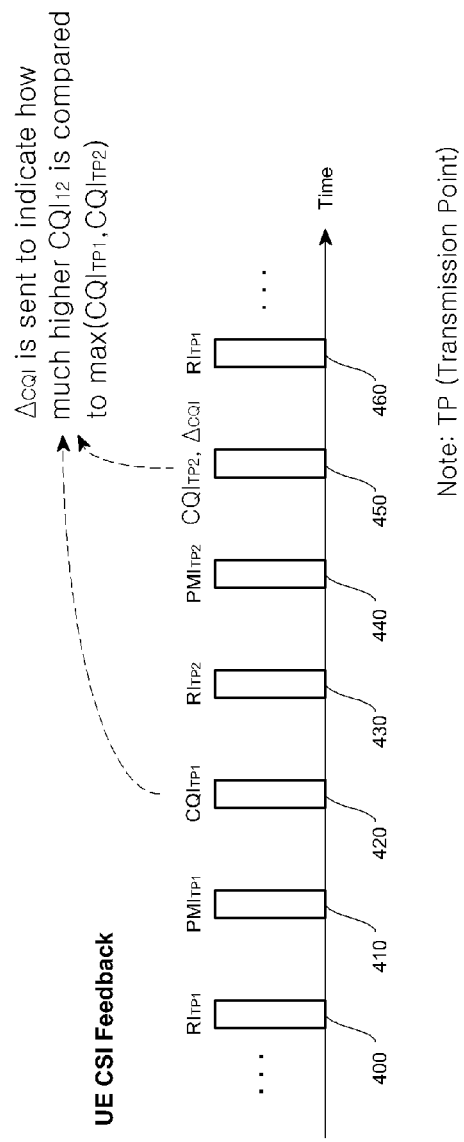

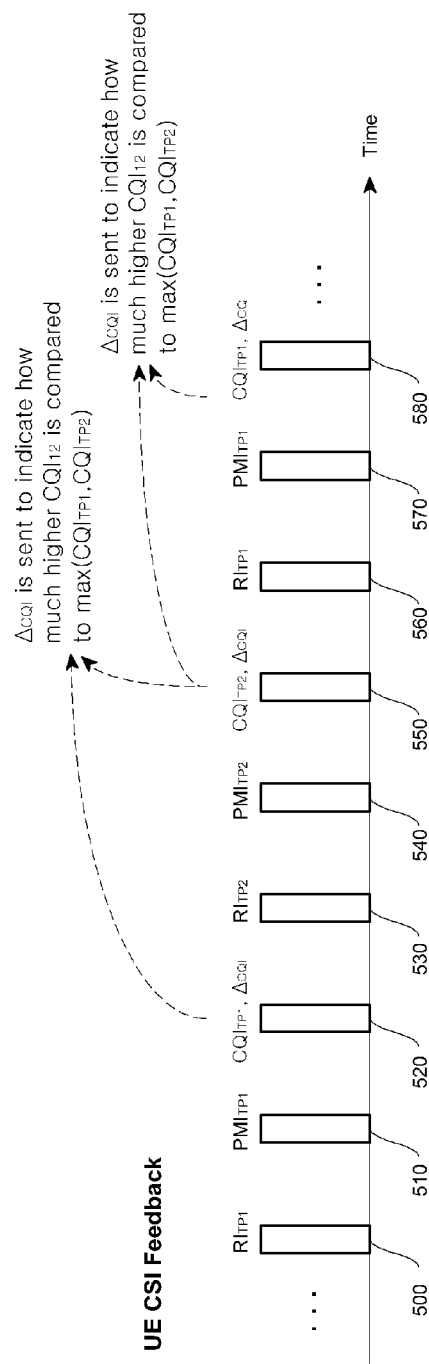
[Fig. 6]

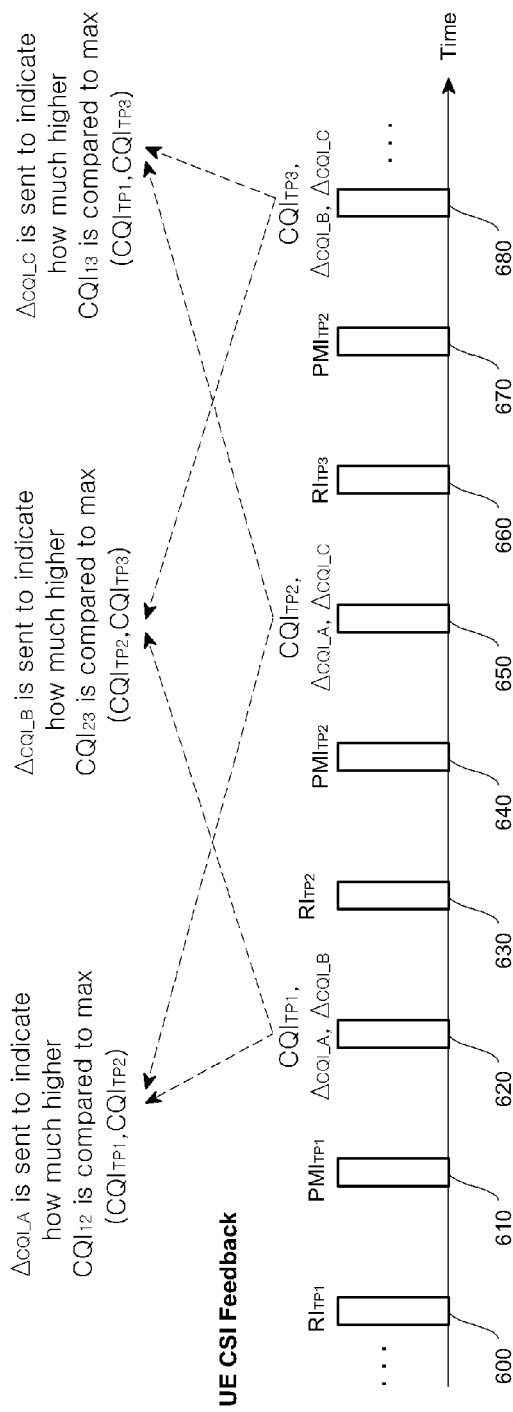

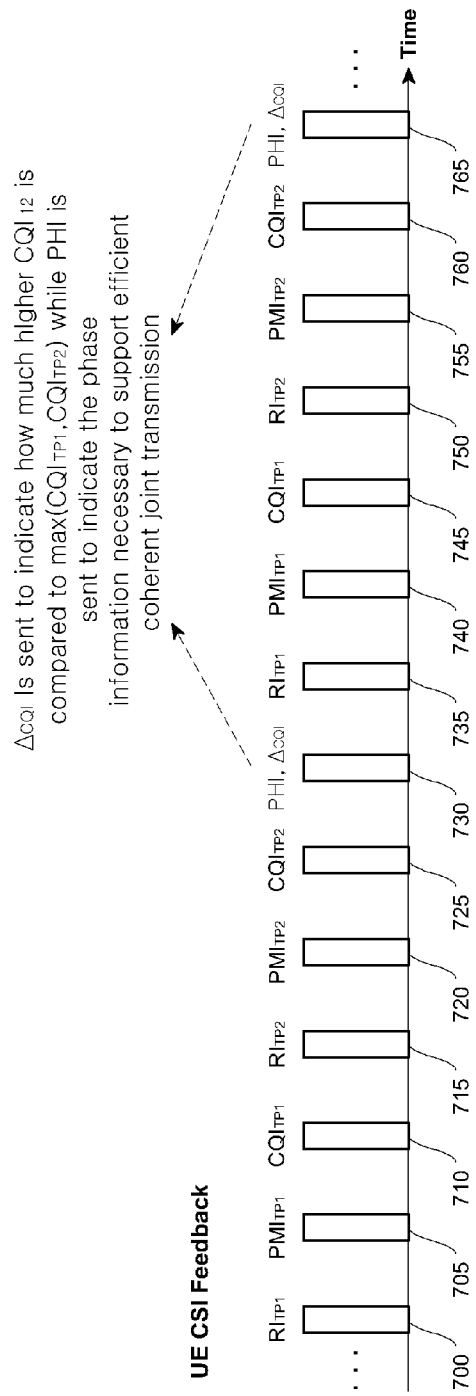
[Fig. 8]

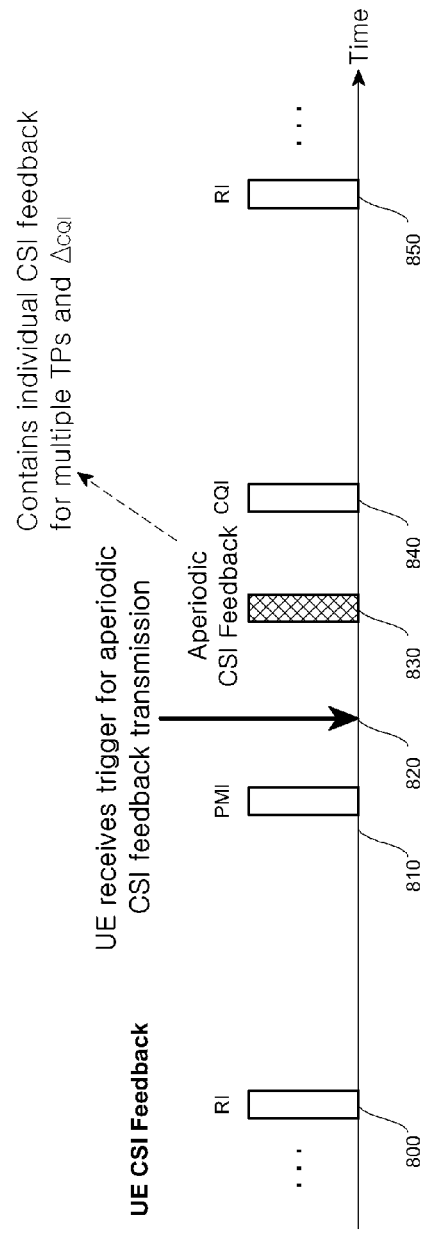
[Fig. 9]

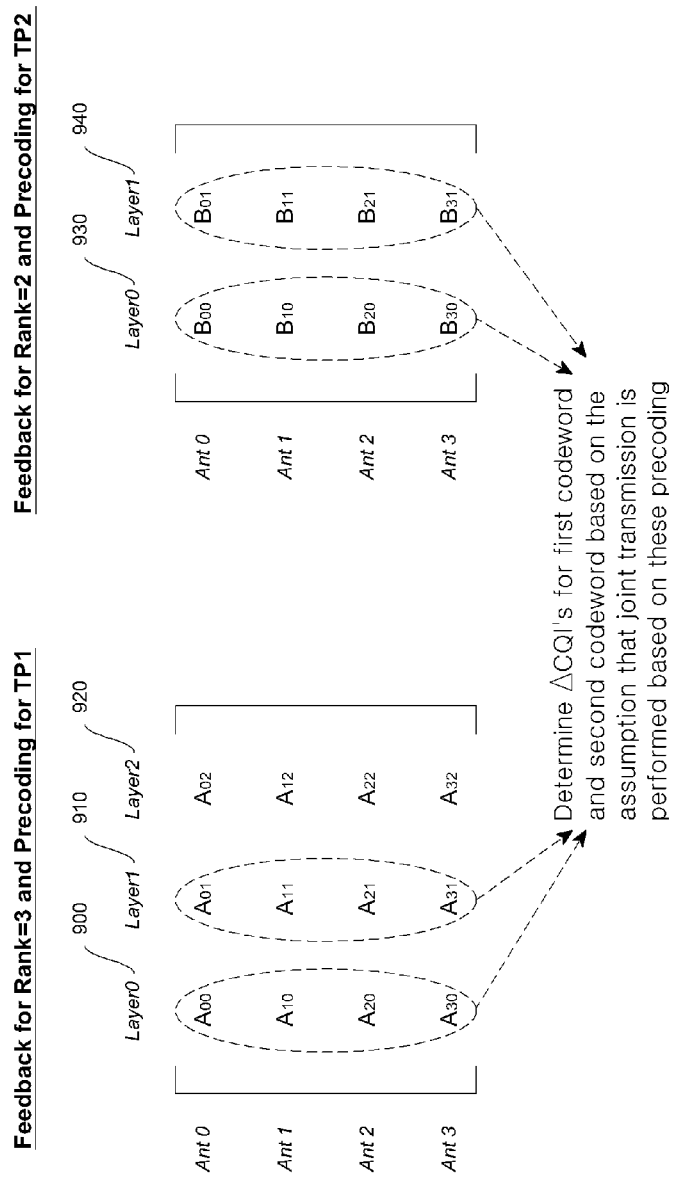
[Fig. 10]

[Fig. 11]
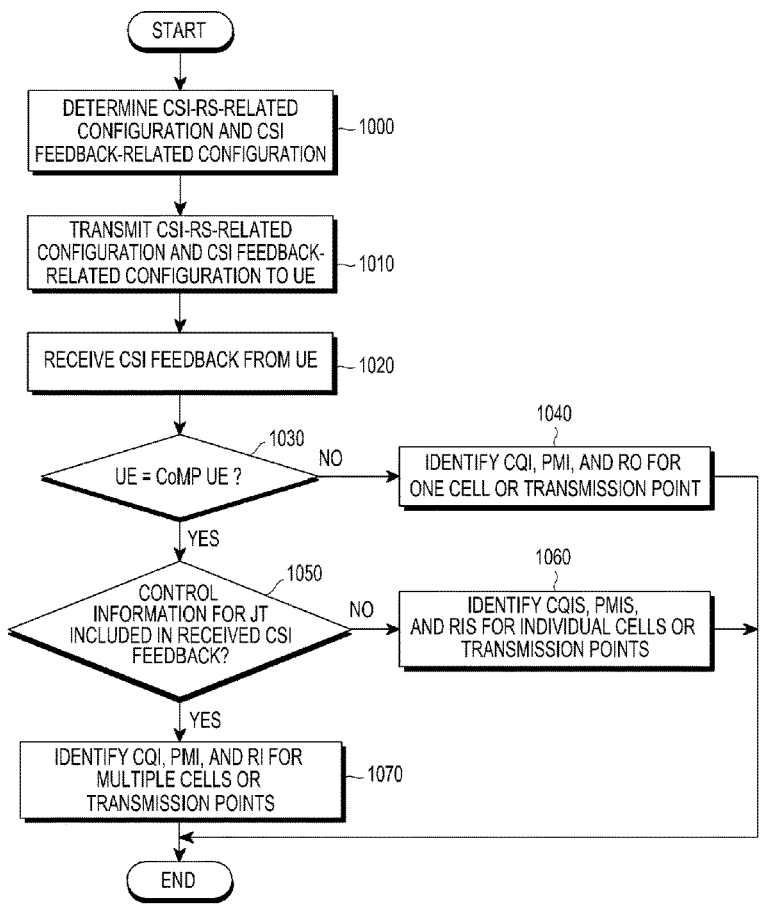
[Fig. 12]
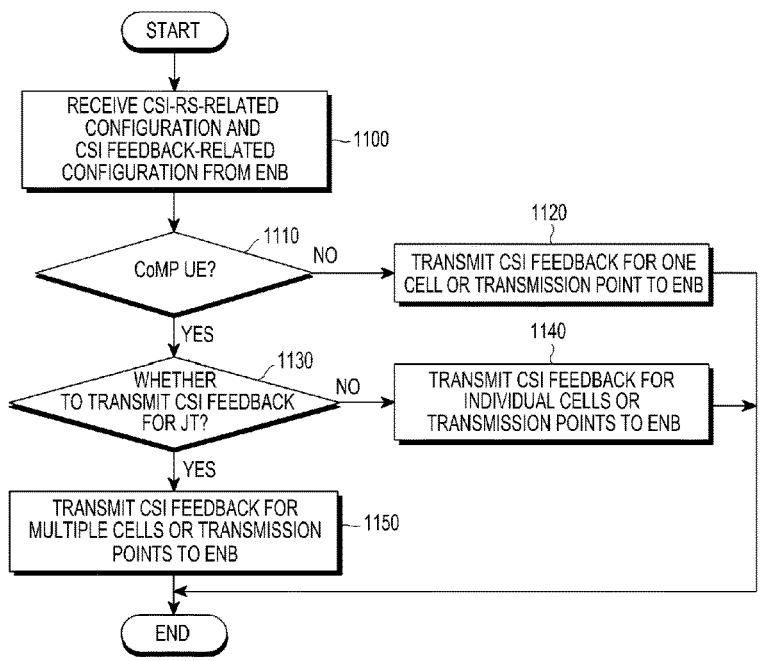

METHOD AND APPARATUS FOR TRANSMITTING AND RECEIVING DOWNLINK CHANNEL STATE INFORMATION IN A MOBILE COMMUNICATION SYSTEM

PRIORITY

This application is a National Stage application under 35 U.S.C. § 371 of International Application No. PCT/KR2012/008080 filed Oct. 5, 2012, which claims priority under 35 U.S.C. § 365(b) to Korean Patent Application No. 10-2011-0102670 filed Oct. 7, 2011, the content of each of which is incorporated herein by reference.

FIELD

The present invention relates generally to a mobile communication system, and more particularly, to a method and apparatus for transmitting and receiving downlink (DL) channel state information (CSI) in a mobile communication system.

BACKGROUND

In addition to providing initial voice-centric services, a mobile communication system has evolved into a high speed and high quality wireless packet data communication system to provide data and multimedia services. Various mobile communication standards such as HSDPA (high speed downlink packet access), HSUPA (high speed uplink packet access), LTE (long term evolution), and LTE-A (long term evolution advanced) of 3GPP (3rd generation partnership project), HRPD (high rate packet data) of 3GPP2, and 802.16 of IEEE (institute of electrical and electronics engineers) have recently been developed to support high speed and high quality wireless packet data transmission services. In particular, the LTE system, which is a system developed to efficiently support high speed wireless packet data transmission, maximizes wireless system capacity by using various wireless access technologies. The LTE-A system, which is a wireless system evolved from the LTE system, has an enhanced data transmission capability as compared to the LTE system.

The existing 3rd generation wireless packet data communication system such as HSDPA, HSUPA, or HRPD employs technologies for improving transmission efficiency, such as an adaptive modulation and coding (AMC) scheme and a channel response scheduling scheme. When the AMC scheme is employed, a transmitter may adjust the amount of transmitted data according to a channel state. That is, a transmitter may efficiently transmit a large amount of information while adjusting the probability of erroneous reception to a desired level by reducing the amount of transmitted data when a channel state is poor and increasing the amount of transmitted data when a channel state is good. When the channel response scheduling scheme is employed, system capacity is increased as compared to the prior art schemes because a transmitter selectively provides a service to a user having a good channel state among multiple users. Such an increase in system capacity is called multiuser diversity. In short, the AMC scheme and the channel response scheduling scheme allow a transmitter to receive feedback of partial channel state information from a receiver and apply an appropriate modulation and coding technique at a point of time determined to be most efficient.

The AMC scheme may also include a function of determining the number of spatial layers for a transmitted signal, that is, a rank, when being used with a multiple input multiple output (MIMO) transmission scheme. According to this AMC scheme, in determining an optimal data rate, a transmitter considers not only a coding rate and a modulation scheme, but also the number of layers to be used for MIMO transmission.

In recent years, research has been actively conducted to change code division multiple access (CDMA), which is a multiple access scheme used in 2nd and 3rd generation mobile communication systems, to orthogonal frequency division multiple access (OFDMA) in a next generation system. Both 3GPP and 3GPP2 have started standardization work on an evolved system using OFDM. It is known that the OFDMA scheme may be expected to increase capacity when compared to the CDMA scheme. One of many factors increasing capacity in the OFDMA scheme is the capability to perform frequency domain scheduling. As the channel response scheduling scheme makes it possible to obtain capacity gain according to the time-varying characteristic of a channel, more capacity gain may be obtained using the frequency-varying characteristic of a channel.

A mobile communication service using a non-coordinated multi-point (non-CoMP) transmission/reception scheme is conventionally provided by a cellular system including multiple cells implemented as shown in FIG. 1.

FIG. 1 illustrates a conventional mobile communication system including three cells, each of which has a transmission/reception antenna disposed at its center.

Referring to FIG. 1, the conventional mobile communication system includes three cells (cell 0, cell 1, and cell 2) each having cell identification (cell ID)=0, cell ID=1, and cell ID=2. An Enhanced node B (eNB) 1, 10, 20 is disposed in each cell, and thus data transmission/reception may be performed between the eNB 1, 10, 20 and a user equipment (UE) 30, 40, 50 existing in a corresponding cell. That is, the UE0 30 existing in the coverage of the cell 0 receives a physical downlink shared channel (PDSCH) from the eNB 1. At the same as the time when the eNB 1 transmits the data signal to the UE0 30 in the cell 0, the cell 1 and the cell 2 also transmit data signals to the UE1 40 and the UE2 50 by using the same time and frequency resources respectively. The data transmission in the cell 0, the cell 1, or the cell 2 corresponds to the non-CoMP transmission scheme in which radio resources in one cell are used only for a UE within the corresponding cell.

When one UE receives a signal from one cell or transmission point, as shown in FIG. 1, the UE sets a cell or transmission point, from which it is to receive the signal, in advance through radio resource control (RRC) signaling. Also, the UE transmits channel state information (CSI) for a downlink channel, that is, downlink CSI (DL-CSI), only to the set cell or transmission point. The CSI includes information on the data rate supportable by the UE, information on the precoder preferred by the UE, and information on the number of spatial layers, that is, a rank, supportable by the UE in MIMO transmission Transmission from one transmission point to one UE, as shown in FIG. 1, has a limitation on the receivable data rate when the UE is far away from the transmission point or is subjected to strong interference from neighboring transmission points.

SUMMARY

Accordingly, an aspect of the present invention is to solve at least the above-described problems occurring in the prior art, and to provide at least the advantages described below.

Another aspect of the present invention is to provide a method and apparatus for transmitting and receiving downlink channel state information (DL-CSI) in a mobile communication system.

Yet another aspect of the present invention is to provide a method and apparatus for transmitting and receiving DL-CSI in order to efficiently use radio resources when a UE receives downlink channels from multiple transmission points.

In accordance with an aspect of the present invention, there is provided a method for transmitting channel state information (CSI) by a user equipment (UE) in a mobile communication system. The method includes receiving a CSI-reference signal (CSI-RS) for measuring a state of a downlink channel and a CSI feedback-related configuration from a base station (BS); determining a channel quality indication (CQI) for at least one transmission point and control information for determining a CQI for multiple transmission points, based on the received CSI-RS and CSI feedback-related configuration; and transmitting the determined CQI for the at least one transmission point and control information to the BS.

In accordance with another aspect of the present invention, there is provided a method for receiving channel state information (CSI) by a base station (BS) in a mobile communication system. The method includes transmitting a CSI-reference signal (CSI-RS) for measuring a state of a downlink channel and a CSI feedback-related configuration to a user equipment (UE); and receiving a channel quality indication (CQI) for at least one transmission point and control information for determining a CQI for multiple transmission points, which are determined based on the transmitted CSI-RS and CSI feedback-related configuration, from the UE.

In accordance with yet another aspect of the present invention, there is provided an apparatus for transmitting channel state information (CSI) by a user equipment (UE) in a mobile communication system. The apparatus includes a receiver for receiving a CSI-reference signal (CSI-RS) for measuring a state of a downlink channel and a CSI feedback-related configuration from a base station (BS); a controller for determining a channel quality indication (CQI) for at least one transmission point and control information for determining a CQI for multiple transmission points, based on the received CSI-RS and CSI feedback-related configuration; and a transmitter for transmitting the determined CQI for the at least one transmission point and control information to the BS.

In accordance with still yet another aspect of the present invention, there is provided an apparatus for receiving channel state information (CSI) by a base station (BS) in a mobile communication system. The apparatus includes a transmitter for transmitting a CSI-reference signal (CSI-RS) for measuring a state of a downlink channel and a CSI feedback-related configuration to a user equipment (UE); and a receiver for receiving a channel quality indication (CQI) for at least one transmission point and control information for determining a CQI for multiple transmission points, which are determined based on the transmitted CSI-RS and CSI feedback-related configuration, from the UE.

In accordance with still yet another aspect of the present invention, there is provided a method for transmitting channel state information (CSI) by a user equipment (UE) in a mobile communication system. The method includes receiving a CSI-reference signal (CSI-RS) for measuring a state of a downlink channel and a CSI feedback-related configuration from a base station (BS); determining rank indicators (RIs) and precoding matrix indicators (PMIs) for respective transmission points, based on the received CSI-RS and CSI feedback-related configuration; and transmitting the determined RIs and PMIs for the respective transmission points.

In accordance with still yet another aspect of the present invention, there is provided a method for receiving channel state information (CSI) by a base station (BS) in a mobile communication system. The method includes transmitting a CSI-reference signal (CSI-RS) for measuring a state of a downlink channel and a CSI feedback-related configuration to a user equipment (UE); receiving rank indicators (RIs) and precoding matrix indicators (PMIs) for respective transmission points, which are determined based on the transmitted CSI-RS and CSI feedback-related configuration, from the UE; and determining an RI for multiple transmission points based on the RIs for the respective transmission points, and combining precoding matrices indicated by the PMIs for the respective transmission points according to the determined RI.

In accordance with still yet another aspect of the present invention, there is provided an apparatus for transmitting channel state information (CSI) by a user equipment (UE) in a mobile communication system. The apparatus includes a receiver for receiving a CSI-reference signal (CSI-RS) for measuring a state of a downlink channel and a CSI feedback-related configuration from a base station (BS); a controller for determining rank indicators (RIs) for respective transmission points and precoding matrix indicator (PMI) for the respective transmission points, based on the received CSI-RS and CSI feedback-related configuration; and a transmitter for transmitting the determined RIs and PMIs for the respective transmission points.

In accordance with still yet another aspect of the present invention, there is provided an apparatus for receiving channel state information (CSI) by a base station (BS) in a mobile communication system. The apparatus includes a transmitter for transmitting a CSI-reference signal (CSI-RS) for measuring a state of a downlink channel and a CSI feedback-related configuration to a user equipment (UE); a receiver for receiving rank indicators (RIs) and precoding matrix indicators (PMIs) for respective transmission points, which are determined based on the transmitted CSI-RS and CSI feedback-related configuration, from the UE; and a controller for determining an RI for multiple transmission points based on the RIs for the respective transmission points, and combining precoding matrices indicated by the PMIs for the respective transmission points according to the determined RI.

BRIEF DESCRIPTION OF DRAWINGS

The above and other aspects, features, and advantages of the present invention will be more apparent from the following detailed description taken in conjunction with the accompanying drawings, in which:

FIG. 1 is a view illustrating a conventional mobile communication system;

FIG. 2 is a view illustrating a CoMP scheme in a mobile communication system;

FIG. 3 is a view illustrating a CoMP scheme in which transmission/reception is performed in the presence of collaboration between different transmission points in the same cell;

FIG. 4 is a view illustrating radio resources of a downlink channel in an LTE/LTE-A system;

FIG. 5 is a view illustrating an example of transmitting control information ($\Delta_{CQI}$) by a UE according to an embodiment of the present invention;

FIG. 6 is a view illustrating another example of transmitting control information $\Delta_{CQI}$ by a UE according to an embodiment of the present invention;

FIG. 7 is a view illustrating yet another example of transmitting control information $\Delta_{CQI}$ by a UE according to an embodiment of the present invention;

FIG. 8 is a view illustrating still yet another example of transmitting control information $\Delta_{CQI}$ by a UE according to an embodiment of the present invention;

FIG. 9 is a view illustrating still yet another example of transmitting control information $\Delta_{CQI}$ by a UE according to an embodiment of the present invention;

FIG. 10 is a diagram illustrating a method for determining a part of a precoding matrix indicated by an individual PMI as precoding for JT;

FIG. 11 is a flowchart illustrating an operation of an eNB according to an embodiment of the present invention; and FIG. 12 is a flowchart illustrating an operation of a UE according to an embodiment of the present invention.

DETAILED DESCRIPTION

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

Further, although an OFDM-based mobile communication system, in particular, the 3GPP EUTRA standard, will be the main subject of the following detailed description of embodiments of the present invention, the main gist of the present invention may be applied to other communication systems with similar technical backgrounds and channel types by slightly modifying them according to the understanding those skilled in the art without departing from the scope of the present invention.

FIG. 2 illustrates a CoMP scheme in which transmission/reception is performed in the presence of collaboration between eNBs of respective cells in a mobile communication system.

Referring to FIG. 2, UE0 130 receives PDSCHs transmitted from cells (cell 0 and cell 1) each having cell ID=0 and cell ID=1. Also, UE1 140 receives PDSCHs transmitted from the cell 0 and a cell (cell 2) having cell ID=2. In order to support the CoMP scheme as shown in FIG. 2, a central controller for collectively controlling eNBs 100, 110, 120 is provided, and the central controller performs determinations related to the CoMP scheme.

FIG. 3 illustrates a CoMP scheme in which transmission/reception is performed in the presence of collaboration between different transmission points in the same cell.

Referring to FIG. 3, there are four transmission points 200, 210, 220, 230 sharing one cell ID. Also, two transmission points 200, 230 of the four transmission points simultaneously transmit PDSCHs to UE1 250, and the other two transmission points 210, 220 simultaneously transmit PDSCHs to UE0 240. In the same manner as in FIG. 2, in order to support the CoMP scheme, a central controller for collectively controlling the four transmission points 200, 210, 220, 230 is also provided in FIG. 3, and the central controller performs determinations related to the CoMP scheme.

Transmission from multiple cells or transmission points to a UE, as described above in FIGS. 2 and 3, is referred to as joint transmission (JT). When JT is performed as described above, a UE transmits information on a downlink channel to the central controller in such a manner that the UE transmits individual channel state information (CSI) for multiple cells or transmission points. As an example, in FIG. 2, upon receiving PDSCHs simultaneously transmitted from the cells 0 and 1, the UE0 130 transmits CSI for the cell 0 and CSI for the cell 1 respectively. Also, in FIG. 3, upon receiving PDSCHs simultaneously transmitted from the transmission points 210, 220, the UE0 240 SI for the transmission point 210 and CSI for the transmission point 220 respectively.

FIG. 4 illustrates radio resources of a downlink channel in an LTE/LTE-A system. The radio resources shown in FIG. 4 correspond to one physical resource block (PRB) pair in the frequency domain and one subframe (1 msec) in the time domain.

Referring to FIG. 4, one PRB pair within one subframe includes 14 OFDM symbols in the time domain and 12 subcarriers in the frequency domains. One subcarrier within one OFDM symbol is defined as a resource element (RE), and one PRB pair within one subframe includes a total of 168 (=14×12) Res. REs constituting one PRB pair carry signals for performing different functions according to their positions in the PRB pair. In FIG. 4, it can be noted that cell specific reference signals (CRSs), demodulation reference signals (DMRSs), PDSCHs, control channels, and the like are transmitted according to the positions of REs. Further, as indicated by reference numerals "300" and "310" in FIG. 4, a CSI-reference signal (CSI-RS) is transmitted in order to allow a UE to measure the state of a downlink channel. As shown in FIG. 4, multiple CS-RSs may be set in order to measure the states of downlink channels for individual cells or transmission points. As an example, "300" of FIG. 4 may be set for a CSI-RS transmitted from the cell 0 of FIG. 2, and "310" of FIG. 4 may be set for a CSI-RS transmitted form the cell 1 of FIG. 2. In this way, a UE may measure individual downlink channels by allocating individual radio resources to CSI-RSs transmitted from different cells or transmission points.

In such a situation as shown in FIG. 2 or FIG. 3, upon receiving CSI for individual cells or transmission points from a UE, the central controller infers channels states, which are to occur when JT is performed, from the multiple individual CSI. In FIG. 2, the UE0 130 informs the central controller that it can receive a data rate of A kbps from the cell 0 and receive a data rate of B kbps from the cell 1. Based on the data rates receivable by the U0 130 from the respective cells, the central controller determines at which data rate radio resources are most efficiently used to transmit PDSCHs to the UE0 130 when JT from the cell 0 and the cell 1 is performed. As an example, if the UE0 130 informs the central controller that it can receive a data rate of 100 kbps when only the cell 0 transmits and receive a data rate of 200 kbps when only the cell 1 transmits, then using the two individual CSI transmitted from the UE0 130, the central controller determines that it is efficient to transmit a data rate of 300 kbps to the UE0 when JT from the cell 0 and the cell 1 is performed. Determining a data rate, the number of spatial layers, or the like related to PDSCH transmission by using CSI for individual cells or transmission points, as described above, has a disadvantage in that it cannot properly reflect the actual channel conditions occurring when JT from multiple cells or transmission points to a UE is performed. That is, it is difficult to infer information on complex channel states, in which JT from multiple cells or transmission points is performed, only from individual CSI. The reason for this is that a central controller does not know the structure of a receiver of a UE in determining DL-CSI transmitted from the UE to the central controller. In general, the relation between individual CSI and complex CSI for JT from multiple cells or transmission points varies according to how the structure of a receiver of a UE is implemented. Thus, when a central controller does not know how the structure of a receiver of a UE is implemented, it is difficult for the corresponding central controller to accurately determine the relation between individual CSI and complex CSI for JT from multiple cells or transmission points, which may cause errors.

In order to avoid errors occurring when complex CSI is inferred using multiple individual CSI, embodiments of the present invention propose to transmit additional information on complex channels, which considers JT from multiple cells or transmission points, by a UE. To this end, in addition to the individual CSI, control information $\Delta_{CQI}$ that makes it possible to infer complex CSI is defined as follows:

The control information $\Delta_{CQI}$ is relative information regarding a channel quality indicator (CQI), which a UE transmits in order to indicate complex CSI. The CQI is information on a maximum data rate that a UE can support while maintaining a reception error rate at a certain level, and in the case of LTE/LTE-A, is sent from a UE to an eNB by using 4 bits. The CQI in the LTE/LTE-A system is defined as summarized below in Table 1.

TABLE 1

| CQI index | Modulation | code rate: 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

When the CoMP scheme is performed as in FIG. 3, a UE transmits individual CQIs for two cells or transmission points, that is, $CQI_1$ and $CQI_2$, in uplink. In general, when two cells or transmission points supporting data rates corresponding to $CQI_1$ and $CQI_2$ respectively perform JT, the data rate receivable by the same UE corresponds to at least the greater value of $CQI_1$ and $CQI_2$. As an example, if a UE can receive 100 kbps and 200 kbps from two cells or transmission points respectively, then the same UE can receive at least 200 kbps when the two cells or transmission points simultaneously transmit. Using this feature, $\Delta_{CQI}$ can be defined with respect to the greater value of $CQI_1$ and $CQI_2$, as given in the following Equation(1):

$$\Delta_{CQI} = CQI_{12} - \max(CQI_1, CQI_2) \quad (1)$$

In Equation (1), $CQI_{12}$ denotes the data rate receivable by a UE when two cells or transmission points simultaneously transmit. In embodiments of the present invention, a UE transmits $\Delta_{CQI}$ in uplink instead of $CQI_{12}$. Transmission of $\Delta_{CQI}$ instead of $CQI_{12}$ has an advantage in that a relatively few bits are required for the transmission. As an example, in the LTE/LTE-A system, 4 bits are required to transmit the CQI, but only 2 bits are required to transmit $\Delta_{CQI}$.

Upon receiving $\Delta_{CQI}$ from a UE as described above, an eNB or central controller can determine $CQI_{12}$ by using $CQI_1$, $CQI_2$, and $\Delta_{CQI}$ received from the UE, as given in the following Equation(2):

$$CQI_{12} = \max(CQI_1, CQI_2) + \Delta_{CQI} \quad (2)$$

The specific meaning of $\Delta_{CQI}$ must be shared between the UE and the eNB or central controller, and the meaning of $\Delta_{CQI}$ proposed in embodiments of the present invention is determined as shown below in Table 2.

TABLE 2

| $\Delta_{CQI}$ value | meaning associated with $CQI_{12}$ |
| --- | --- |
| 00 | $CQI_{12}$ is the same as $\max(CQI_1, CQI_2)$ |
| 01 | $CQI_{12}$ is a CQI value that is higher by one step than $\max(CQI_1, CQI_2)$ |
| 10 | $CQI_{12}$ is a CQI value that is higher by two steps than $\max(CQI_1, CQI_2)$ |
| 11 | $CQI_{12}$ is a CQI value that is higher by three steps than $\max(CQI_1, CQI_2)$ |

In Table 2, it can be noted that $\Delta_{CQI}$ is so designed as to assign $CQI_{12}$ to a value of at least $\max(CQI_1, CQI_2)$ or greater. This results from the fact that when two cells or transmission points supporting $CQI_1$ and $CQI_2$ respectively perform JT, a data rate of at least $\max(CQI_1, CQI_2)$ can be supported, as described above.

Table 2 corresponds to the case where 2 bits are used to indicate $\Delta_{CQI}$. When 1 bit is used to indicate $\Delta_{CQI}$, the meaning of $\Delta_{CQI}$ may be determined as shown below in Table 3.

TABLE 3

| $\Delta_{CQI}$ value | meaning associated with $CQI_{12}$ |
| --- | --- |
| 0 | $CQI_{12}$ is the same as $\max(CQI_1, CQI_2)$ |
| 1 | $CQI_{12}$ is a CQI value that is higher by M steps than $\max(CQI_1, CQI_2)$ |

In Table 3, M is a value that is set between an eNB or central controller and a UE in advance, and other values may also be applied in consideration of the channel environment and the like.

Equations (1) and (2) and Tables 2 and 3 all relate to a case where the number of cells or transmission points performing JT is 2. This may also be applied in the same manner when any number of cells or transmission points perform JT. When cell 1 to cell N perform JT, the following modified forms of Equations (1) and (2) may be applied as shown in Equations (3) and (4) respectively below:

$$\Delta_{CQI} = CQI_{JT} - \max(CQI_1, \ldots, CQI_N) \quad (3)$$

$$CQI_{JT} = \max(CQI_1, \ldots, CQI_N) + \Delta_{CQI} \quad (4)$$

In Equations (3) and (4), $CQI_{JT}$ corresponds to the data rate receivable by a UE when cell 1 to cell N perform JT. Also, Table 4 below, which is the modified form of Table 2, may be applied.

TABLE 4

| $\Delta_{CQI}$ value | meaning associated with $CQI_{JT}$ |
|---|---|
| 00 | $CQI_{JT}$ is the same as $\max(CQI_1, \ldots, CQI_N)$ |
| 01 | $CQI_{JT}$ is a CQI value that is higher by one step than $\max(CQI_1, \ldots, CQI_N)$ |
| 10 | $CQI_{JT}$ is a CQI value that is higher by two steps than $\max(CQI_1, \ldots, CQI_N)$ |
| 11 | $CQI_{JT}$ is a CQI value that is higher by three steps than $\max(CQI_1, \ldots, CQI_N)$ |

FIG. 5 illustrates an example of transmitting control information $\Delta CQI$ by a UE according to an embodiment of the present invention.

Referring to FIG. 5, this example corresponds to a case where UE CSI feedback is periodic in nature. In the case of such periodic CSI feedback, information is carried by a physical uplink control channel (PUCCH) of the LTE/LTE-A system. The periodic CSI feedback allows a UE to periodically perform CSI feedback only by one-time setting. In FIG. 5, CSI feedback is performed at periodic points of time as indicated by reference numerals "400", "410", "420", "430", "440", "450", and "460", and different CSI may be transmitted at each point of time when the CSI feedback is transmitted. The CSI may include a rank indicator (RI) informing of how many spatial layers a UE supports, a precoding matrix indicator (PMI) informing of which precoding a UE prefers, and a CQI informing of which data rate a UE can receive. Also, as described above, the CSI feedback is separately performed for each cell or transmitted point. The control information $\Delta_{CQI}$ proposed in the present invention may be transmitted together with an individual CQI for a specific cell or transmission point, as shown at 450 of FIG. 5. Upon receiving $\Delta_{CQI}$ at 450 of FIG. 5, an eNB or central controller determines a CQI, which is to occur when JT is performed, by using $\Delta_{CQI}$ and individual CQIs ($CQI_{TP1}$, $CQI_{TP2}$) at 420 and 450 of FIG. 5.

FIG. 6 illustrates another example of transmitting control information $\Delta_{CQI}$ by a UE according to an embodiment of the present invention.

Referring to FIG. 6, this example corresponds to a case where UE CSI feedback is periodic in nature. In the case of such periodic CSI feedback, information is carried by a PUCCH of the LTE/LTE-A system. In general, as described above, CSI feedback is separately performed for each cell or transmission point. The control information $\Delta_{CQI}$ proposed in the present invention is transmitted together whenever an individual CQI is transmitted as shown at 520, 550, and 580 of FIG. 6. By transmitting $\Delta_{CQI}$ whenever an individual CQI is transmitted, a CQI, which is to occur when JT is performed, is transmitted to an eNB or central controller at relatively short periods, which makes it possible for the eNB or central controller to more efficiently use radio resources. Upon receiving $\Delta_{CQI}$ at 550 of FIG. 6, an eNB or central controller determines a CQI, which is to occur when JT is performed, by using $\Delta_{CQI}$ and individual CQIs ($CQI_{TP1}$, $CQI_{TP2}$) at 520 and 550 of FIG. 6.

FIG. 7 illustrates yet another example of transmitting control information $\Delta CQI$ by a UE according to an embodiment of the present invention.

Referring to FIG. 7, this example corresponds to a case where UE CSI feedback is periodic in nature. In the case of such periodic CSI feedback, information is carried by a PUCCH of the LTE/LTE-A system. In general, as described above, CSI feedback is separately performed for each cell or transmission point. The control information $\Delta_{CQI}$ proposed in the present invention is transmitted together whenever an individual CQI is transmitted as shown at 620, 650, and 680 of FIG. 7. Dissimilar to FIG. 5 or FIG. 6, in FIG. 7, $\Delta_{CQI}$ is transmitted such that two of three cells or transmission points may perform JT. $\Delta_{CQI\_A}$ transmitted at 620 and 650 of FIG. 7 indicates how much higher a data rate receivable by a UE is than $\max(CQI_{TP1}, CQI_{TP2})$ when transmission point 1 and transmission point 2 perform JT. Also, $\Delta_{CQI\_B}$ transmitted at 620 and 680 of FIG. 7 indicates how much higher a data rate receivable by a UE is than $\max(CQI_{TP2}, CQI_{TP3})$ when transmission point 2 and transmission point 3 perform JT. Further, $\Delta_{CQI\_C}$ transmitted at 650 and 680 of FIG. 7 indicates how much higher a data rate receivable by a UE is than $\max(CQI_{TP1}, CQI_{TP3})$ when transmission point 1 and transmission point 3 perform JT. In FIG. 6, it can be noted that $\Delta_{CQI}$ is determined and transmitted on the assumption that two of three transmission points perform JT. Also, individual CQIs considered in $\Delta_{CQI}$ transmitted at a specific point of time correspond to a COI for an individual transmission point, which is transmitted together at that point of time when $\Delta_{CQI}$ is transmitted, and a CQI for an individual transmission point, which has been transmitted before that point of time. That is, $\Delta_{CQI\_A}$ and $\Delta_{CQI\_B}$ transmitted at 650 of FIG. 7 are all determined using $CQI_{TP2}$ transmitted at 650 and $CQI_{TP1}, CQI_{TP3}$ transmitted before 650.

FIG. 8 illustrates still yet another example of transmitting control information $\Delta_{CQI}$ by a UE according to an embodiment of the present invention.

Referring to FIG. 7, this example corresponds to a case where UE CSI feedback is periodic in nature. In the case of such periodic CSI feedback, information is carried by a PUCCH of the LTE/LTE-A system. In general, as described above, CSI feedback is separately performed for each cell or transmission point. The control information $\Delta_{CQI}$ proposed in the present invention is transmitted together whenever an individual phase indicator (PHI) is transmitted, as shown at 730 and 765 of FIG. 8. The PHI is used to indicate with which phase difference a cell or transmission point is to transmit a signal in order to provide coherent combining. This PHI is information required when coherent joint transmission (coherent JT) is performed, and generally has an information amount of 2 to 3 bits. The reason why a UE transmits $\Delta_{CQI}$ and a PHI at the same point of time is that these two information are all associated with JT and an eNB or central controller necessarily requires all the two information for coherent JT. Control information transmitted at each point of time of transmission has a probability of causing a reception error, but JT can be supported only when $\Delta_{CQI}$ and a PHI are all received without reception errors. On account of this, it is necessary to minimize the probability that any one of $\Delta_{CQI}$ and a PHI causes a reception error, and in this view, it is advantageous to transmit these two information at the same point of time, as shown in FIG. 8.

In Equations (1), (2), (3), and (4), $\Delta_{CQI}$ is determined based on the greatest value of multiple CQI values. In addition to this determination method, another determination method proposed in the present invention is to determine $\Delta_{CQI}$ based on a specific CQI value when $\Delta_{CQI}$ is transmitted together with the corresponding CQI value, as shown in FIG. 5 or FIG. 6. As an example, a UE transmits $\Delta_{CQI}$ and $CQI_{TP1}$ at 520 of FIG. 6, and transmits $\Delta_{CQI}$ and $CQI_{TP2}$ at 550 of FIG. 6. At this time, $\Delta_{CQI}$ transmitted at 520 of FIG. 6 is used to indicate how much higher a CQI for JT is than $CQI_{TP1}$, and $\Delta_{CQI}$ transmitted at 550 of FIG. 6 is used to indicate how much higher a CQI for JT is than $CQI_{TP2}$.

FIG. 9 illustrates still yet another example of transmitting control information $\Delta_{CQI}$ by a UE according to an embodiment of the present invention.

Referring to FIG. 9, this example corresponds to a case where a UE performs aperiodic CSI feedback under instructions of an eNB or central controller while performing periodic CSI feedback. In general, as described above, CSI feedback is separately performed for each cell or transmission point. In the case of the periodic CSI feedback, information is carried by a PUCCH of the LTE/LTE-A system. Contrarily, in the case of the aperiodic CSI feedback, information is carried by a PUSCH. CSI feedback transmitted at 800, 810, 840, and 850 of FIG. 9 corresponds to the periodic CSI feedback performed at periodic points of time. Contrarily, CSI feedback transmitted at 830 of FIG. 9 corresponds to the aperiodic CSI feedback, and this aperiodic CSI feedback is performed after a UE receives instructions for the aperiodic CSI feedback at 820 of FIG. 9. Reference numeral "820" of FIG. 9 indicates an aperiodic CSI feedback trigger that is carried by a PDCCH from an eNB to a UE.

In general, the aperiodic CSI feedback of FIG. 9 may include individual CSI feedback for one or multiple cells or transmission points according to its settings. When individual CSI feedback for multiple cells or transmission points is transmitted, the aperiodic CSI feedback may include the following information:

<Aperiodic CSI Feedback Information 1>

$RI_{TP1}/PMI_{TP1}/CQI_{TP1}$ for transmission point 1 (or cell 1)

$RI_{TP2}/PMI_{TP2}/CQI_{TP2}$ for transmission point 2 (or cell 2)

$\Delta_{CQI}$ for performing JT from transmission point 1 and transmission point 2 (or cell 1 and cell 2).

$\Delta_{CQI}$ of the aperiodic CSI feedback information 1 is determined by Equation (1) or (3), based on individual CQIs ($CQI_{TP1}, CQI_{TP2}$) for transmission point 1 and transmission point 2. Contrarily, when individual CSI feedback for one cell or transmission point is transmitted, the aperiodic CSI feedback may include the following information:

<Aperiodic CSI Feedback Information 2>

$RI_{TP1}/PMI_{TP1}/CQI_{TP1}$ for transmission point 1 (or cell 1)

$\Delta_{CQI}$ for performing JT from transmission point 1 and transmission point 2 (or cell 1 and cell 2).

$\Delta_{CQI}$ of the aperiodic CSI feedback information 2 is determined by Equation (1) or (3), based on CQI information for transmission point 1 (or cell 1), which is included in the aperiodic feedback, and CQI information for transmission point 2 (or cell 2), which has been transmitted before the aperiodic CSI feedback.

In FIG. 5, FIG. 6, FIG. 7, FIG. 8, and FIG. 9, it is assumed that one individual CQI is transmitted for one cell or transmission point. In the LTE/LTE-A system, when MIMO transmission is supported in a downlink channel, a signal may be transmitted from one cell or transmission point to a UE by multiple spatial layers. When a signal is transmitted by multiple spatial layers in the LTE/LET-A system in this way, a UE transmits two CQIs for one cell or transmission point. Transmitting two CQIs for one cell or transmission point is intended to support accurate AMC for two codewords transmitted by different spatial layers. Also, the UE transmits the above-mentioned RI to an eNB and thereby informs the eNB how many spatial layers it can support. The number of spatial layers, that is, a rank, is used in the same meaning as the number of MIMO signals. When a UE transmits multiple CQIs for one cell or transmission point, the following situations may occur:

Situation 1: When individual RI values for multiple cells or transmission points indicates one spatial layer, a UE transmits one CQI for each cell or transmission point.

Situation 2: When some of individual RI values for multiple cells or transmission points indicate multiple spatial layers, a UE transmits two CQIs for each cell or transmission point.

Situation 1 corresponds to the control method transmission methods proposed in the present invention, which have been described in connection with FIG. 5, FIG. 6, FIG. 7, FIG. 8, and FIG. 8, so a detailed description thereof will be omitted here.

Situation 2 corresponds to a case where a UE may receive at least two spatial layers from different cells or transmission points. In such a case, for each cell or transmission point, a UE must transmit two CQIs for two codewords. With regard to this, in embodiments of the present invention, a UE transmits individual $\Delta_{CQI}$ for each codeword and thereby allows multiple cells or transmission points to perform JT. $\Delta_{CQI}(CW0)$ for a first codeword is obtained using Equation (1) or (3), based on CQI values for transmission point 1 and transmission point 2, that is, $CQI_{CW0TP1}$ and $CQI_{CW0TP2}$, which a UE transmits for the first codeword. Also, $\Delta_{CQI}(CW1)$ for a second codeword is obtained using Equation (1) or (3), based on CQI values for transmission point 1 and transmission point 2, that is, $CQI_{CW1TP1}$ and $CQI_{CW1TP2}$, which a UE transmits for the second codeword.

When a UE can support multiple spatial layers for some of different cells or transmission points, as described above, the numbers of spatial layers for the respective cells or transmission points may be different. As an example, a UE may determine that it can support two spatial layers (rank=2) for transmission point 1, and inform an eNB of rank=2 for transmission point 1. In contrast to this, the UE may determine that it can support three spatial layers (rank=3) for transmission point 2, and inform the eNB of rank=3 for transmission point 2. When in this way a UE informs an eNB that it can support different numbers of spatial layers for multiple cells or transmission points, the eNB must determine how many spatial layers it is to transmit for JT. In embodiments of the present invention, when a UE informs an eNB that it can support different numbers of spatial layers for multiple cells or transmission points, the eNB determines the number of spatial layers, which are to be transmitted through JT, by using the following Equations (5) and (6) without any separate additional control information:

$$RANK_{JT} = \min(RANK_1, RANK_2) \quad (5)$$

$$RANK_{JT} = \min(RANK_1, \ldots, RANK_N) \quad (6)$$

In Equations (5) and (6), it can be noted that the number of spatial layers to be transmitted through JT is the minimum value of individual ranks for multiple cells or transmission points. When the number of spatial layers of a signal to be transmitted through JT is determined using Equations (5) and (6) proposed in the present invention, there is an advantage in that a UE does not need to transmit any additional information other than rank information for each cell or transmission point to an eNB. Whether or not to apply Equations (5) and (6) is determined not through RRC signaling, but through prearranged appointments. That is, when Equations (5) and (6) are used, a UE determines $\Delta_{CQI}$ and the like according to the results of Equations (5) and (6), and an eNB or central controller assumes that $\Delta_{CQI}$ and the like have been determined according to the results of Equations (5) and (6).

With regard to Situation 2, another important thing to be determined so as to efficiently perform JT is a matter of precoding. In the LTE/LTE-A system, a UE informs an eNB of its preferred precoding by transmitting a precoding matrix indicator (PMI) to the eNB. In the case of a mobile communication system supporting the CoMP scheme, a UE must transmit individual PMIs for multiple cells or transmission points. Codeword to layer mapping in the LTE/LTEA system is summarized below in Table 5.

TABLE 5

| no. of layers | codeword to layer mapping |
| --- | --- |
| 1 | CW1: layer 0 |
| 2 | CW1: layer 0 |
|   | CW2: layer 1 |
| 3 | CW1: layer 0 |
|   | CW2: layer 1, layer 2 |
| 4 | CW1: layer 0, layer 1 |
|   | CW2: layer 2, layer 3 |
| 5 | CW1: layer 0, layer 1 |
|   | CW2: layer 2, layer 3, layer 4 |
| 6 | CW1: layer 0, layer 1, layer 2 |
|   | CW2: layer 3, layer 4, layer 5 |
| 7 | CW1: layer 0, layer 1, layer 2 |
|   | CW2: layer 3, layer 4, layer 5, layer 6 |
| 8 | CW1: layer 0, layer 1, layer 2, layer 3 |
|   | CW2: layer 4, layer 5, layer 6, layer 7 |

As described above, when a UE transmits individual PMIs, an eNB can determine precoding to be applied to JT by using PHI information in a case where individual RIs transmitted by the UE for respective cells or transmission points have the same value. Contrarily, in a case where individual RIs transmitted by a UE for respective cells or transmission points have different values, an eNB determines a rank for JT by the minimum value of individual ranks, as described above. In this case, there is a problem with how to assume precoding for JT when the individual ranks are greater than the determined rank for JT. As a solution to this problem, a UE may separately transmit control information on precoding for JT, but this solution has a disadvantage in that additional uplink overhead is caused. To solve the above problem, the present invention proposes to assume a part of a precoding matrix indicated by an individual PMI as precoding for JT by using a prearranged method.

FIG. 10 illustrates a method for determining a part of a precoding matrix indicated by an individual PMI as precoding for JT.

Referring to FIG. 10, a UE informs an eNB of rank=3 for transmission point 1 and its preferred precoding matrix for transmission point 1, which is shown in the left side of FIG. 10. Also, the UE informs the eNB of rank=2 for transmission point 2 and its preferred precoding matrix for transmission point 2, which is shown in the right side of FIG. 10. The number of vertical lines of each precoding matrix corresponds to the number of spatial layers, that is, a rank. The number of horizontal lines of each precoding matrix corresponds to the number of transmission antennas. Further, each of column vectors constituting each precoding corresponds to precoding for a signal transmitted by one spatial layer. In the case of FIG. 10, the UE and the eNB assume the rank for JT (from transmission points 1 and 2) as 2 (the minimum value of the individual ranks) according to the rank determination method. Thus, it is necessary to determine which two of the three column vectors of the left precoding matrix are assumed as precoding for JT, and a result of the determination must be shared between the UE and the eNB.

The present invention proposes to select column vectors according to a prearranged method without transmitting any additional control information. By applying such a prearranged method, there is no need to transmit any additional control information, and $\Delta_{CQI}$ transmitted by a UE is determined based on precoding determined by the prearranged method. Also, an eNB can know which precoding is selected to apply the determined $\Delta_{CQI}$ when JT is performed, only by individual PMI information without any separate control information from the UE. Table 6 below summarizes how to determine a part of a precoding matrix indicated by an individual PMI as precoding for JT.

TABLE 6

| rank associated with TP 1 | rank associated with TP 2 | rank for JT | precoding assumption for performing JT |
| --- | --- | --- | --- |
| 1 | 1 | 1 | entire precoding matrix for TP 1 |
|   |   |   | entire precoding matrix for TP 2 |
| K (≥2) | K (≥2) | K | entire precoding matrix for TP 1 |
|   |   |   | entire precoding matrix for TP 2 |
| L (≥2) | 1 | 1 | first column vector from precoding matrix for TP 1 |
|   |   |   | first column vector from precoding matrix for TP 2 |
| 3 | 2 | 2 | first and second column vectors from precoding matrix for TP 1 |
|   |   |   | first and second column vectors from precoding matrix for TP 2 |
| 4 | 2 | 2 | first and third column vectors from precoding matrix for TP 1 |
|   |   |   | first and second column vectors from precoding matrix for TP 2 |
| 4 | 3 | 3 | first, second, and third column vectors from precoding matrix for TP 1 |
|   |   |   | first, second, and third column vectors from precoding matrix for TP 2 |

In Table 6, "TP" means a transmission point. The method selecting column vectors from a precoding matrix, shown in Table 6, was obtained by selecting a part of layers assigned according to codewords in consideration of the above codeword to layer mapping relation in LTE/LTE-A.

FIG. 11 illustrates an operation of an eNB according to an embodiment of the present invention, in which the eNB sets UE CSI feedback and determines CSI for JT by using CSI feedback transmitted by a UE in order to perform JT according to an embodiment of the present invention.

Referring to FIG. 11, in step 1000, the eNB determines a CSI-RE-related configuration for allowing a UE to measure a downlink channel state and a CSI feedback-related configuration for transmitting CSI by the UE having measured CSI-RSs. In step 1010, the eNB transmits the determined CS-RS-related configuration and CI feedback-related configuration to the UE through UE-specific RRC signaling. In addition to these configurations, the eNB also informs the UE whether or not the corresponding UE is a UE to receive CoMP signals through JT and how the corresponding UE is to transmit JT-related CSI feedback when the UE is a CoMP UE.

Subsequently, in step 1020, the eNB receives CSI feedback from the UE. In step 1030, the eNB checks if the UE is a CoMP UE. The eNB proceeds to step 1040 when the UE is not a CoMP UE, and proceeds to step 1050 when the UE is a CoMP UE. In step 1040, the eNB identifies a CQI, a PMI, and an RI for one cell or transmission point through the received CSI feedback. In step 1050, the eNB determines if the received CSI feedback includes control information for performing JT. The eNB proceeds to step 1060 when the received CSI feedback does not include control information for performing JT, and proceeds to step 1070 when the received CSI feedback includes control information for performing JT. In step 1060, the eNB identifies CQIs, PMIs, and RIs for individual cells or transmission points through the received CSI feedback. In step 1070, the eNB identifies a CQI, a PMI, and an RI for performing JT from multiple cells or transmission points through the received CSI feedback.

FIG. 12 illustrates an operation of a UE according to an embodiment of the present invention, in which the UE transmits CSI feedback for JT under instructions of an eNB in order to perform JT according to an embodiment of the present invention.

Referring to FIG. 12, in step 1100, the UE receives a CSI-RS-related configuration and a CSI feedback-related configuration from the eNB through UE-specific RRC signaling. In addition to these configurations, the UE is also informed whether or not the UE is a UE to receive CoMP signals through JT and whether or not the UE is to transmit CSI feedback for JT when the UE is a CoMP UE.

In step 1110, the UE checks if it is a CoMP UE. The UE proceeds to step 1120 when it is not a CoMP UE, and proceeds to step 1130 when it is a CoMP UE. In step 1020, the UE transmits CSI feedback including a CQI, a PMI, and an RI for one cell or transmission point to the eNB. In step 1130, the UE checks if it is to transmit CSI feedback for JT. The UE proceeds to step 1140 when it does not transmit CSI feedback for JT, and proceeds to step 1150 when it transmits CSI feedback for JT. Here, as described above, the CSI feedback for JT may be performed at periodic points of time, and may also be performed in the form of aperiodic CSI feedback under instructions of the eNB. In step 1150, the UE transmits CSI feedback including a CQI, a PMI, and an RI for multiple cells or transmission points to the eNB. In step 1140, the UE transmits CSI feedback including CQIs, PMIs, and RIs for individual cells or transmission points to the eNB.

Here, each of the eNB and the UE includes a transmitter unit, a receiver unit, and a controller unit, and each unit performs the above operations according to embodiments of the present invention.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. A method for transmitting channel state information (CSI) by a user equipment (UE) in a mobile communication system, the method comprising:
receiving a CSI-reference signal (CSI-RS) used for measuring a downlink channel and configuration information related to a CSI feedback from a base station (BS);
determining channel quality indicators (CQIs) of at least two cells involved in a joint transmission and control information related to a CQI for the joint transmission of the at least two cells, based on the CSI-RS and the configuration information related to the CSI feedback; and
transmitting feedback information comprising the determined CQIs and the control information to the BS,
wherein the control information comprises a relative value indicating a difference between a data rate receivable by the UE when the at least two cells simultaneously transmit and a data rate corresponding to a greatest CQI among the determined CQIs.

2. The method of claim 1, wherein the relative value is determined by a following equation, $$\Delta_{CQI} = CQI_{JT} - \max(CQI_1, \ldots, CQI_N)$$

where $\Delta_{CQI}$ denotes the relative value, N is a number of the at least two cells involved in the joint transmission, $CQI_{JT}$ denotes the data rate receivable by the UE when the at least two cells simultaneously transmit, and $\max(CQI_1, \ldots CQI_N)$ denotes the greatest CQI among the determined CQIs.

3. The method of claim 1, wherein the feedback information further comprises rank indicators (RIs) and precoding matrix indicators (PMIs) for the each of the at least two cells, and
wherein the RIs and the PMIs are determined based on the CSI-RS and the configuration information related to the CSI feedback.

4. The method of claim 1, wherein the configuration information related to CSI feedback comprises at least one of first information indicating whether the UE receives coordinated multi-point (CoMP) signals and second information indicating whether the UE transmits CSI feedback for the joint transmission of the at least two cells.

5. A method for receiving channel state information (CSI) by a base station (BS) in a mobile communication system, the method comprising:
transmitting, to a user equipment (UE), a CSI-reference signal (CSI-RS) used for measuring a downlink channel and configuration information related to a CSI feedback;
receiving, from the UE, feedback information, which is determined based on the CSI-RS and the configuration information related to the CSI feedback, comprising determined channel quality indicators (CQIs) and control information related to a CQI for a joint transmission of at least two cells; and
obtaining a data rate receivable by the UE when the at least two cells simultaneously transmit, based on the determined CQIs and the control information,
wherein the control information comprises a relative value indicating a difference between the data rate receivable by the UE when the at least two cells simultaneously transmit and a data rate corresponding to a greatest CQI among the determined CQIs.

6. The method of claim 5, wherein the relative value is determined by a following equation, $$\Delta_{CQI} = CQI_{JT} - \max(CQI_1, \ldots, CQI_N)$$

where $\Delta_{CQI}$ denotes the relative value, N is a number of the at least two cells involved in the joint transmission, $CQI_{JT}$ denotes the data rate receivable by the UE when the at least two cells simultaneously transmit, and $\max(CQI_1, \ldots CQI_N)$ denotes the greatest CQI among the at least two CQIs for each of the at least two cells.

7. The method of claim 5, wherein the feedback information further comprises rank indicators (RIs) and precoding matrix indicators (PMIs) for the each of the at least two cells, and
wherein the RIs and the PMIs are determined based on the CSI-RS and the configuration information related to the CSI feedback.

8. The method of claim 7, wherein an RI for the at least two cells is determined based on a smallest RI of the RIs for the each of the at least two cells.

9. The method of claim 8, further comprising combining precoding matrices comprising combining partial columns from precoding matrices indicated by the PMIs for the each of the at least two cells based on the determined RI when the RIs for the each of the at least two cells are different.

10. An apparatus for transmitting channel state information (CSI) by a user equipment (UE) in a mobile communication system, the apparatus comprising:
a receiver configured to receive a CSI-reference signal (CSI-RS) use for measuring a downlink channel and a configuration information related to a CSI feedback from a base station (BS);
a controller configured to determine channel quality indicators (CQIs) of at least two cells involved in a joint transmission and control information related to a CQI for the joint transmission of the at least two cells, based on the CSI-RS and the configuration information related to the CSI feedback; and
a transmitter for transmitting feedback information comprising the determined CQIs and the control information to the BS,
wherein the control information comprises a relative value indicating a difference between a data rate receivable by the UE when the at least two cells simultaneously transmit and a data rate corresponding to a greatest CQI among the determined CQIs.

11. The apparatus of claim 10 wherein the relative value is determined by a following equation, $$\Delta_{CQI} = CQI_{JT} - \max(CQI_1, \ldots, CQI_N)$$

where $\Delta_{CQI}$ denotes the relative value, N is a number of the at least two cells involved in the joint transmission, $CQI_{JT}$ denotes the data rate receivable by the UE when the at least two cells simultaneously transmit, and $\max(CQI_1, CQI_N)$ denotes the greatest CQI among the determined CQIs.

12. The apparatus of claim 10, wherein the feedback information further comprises rank indicators (RIs) and precoding matrix indicators (PMIs) for the each of the at least two cells, and
wherein the RIs and the PMIs are determined based on the CSI-RS and the configuration information related to the CSI feedback.

13. An apparatus for receiving channel state information (CSI) by a base station (BS) in a mobile communication system, the apparatus comprising:
a transmitter configured to transmit, to a user equipment (UE), a CSI-reference signal (CSI-RS) used for measuring a downlink channel and configuration information related to a CSI feedback;
a receiver configured to receive, from the UE, feedback information, which is determined based on the CSI-RS and the configuration information related to the CSI feedback, comprising determined channel quality indicators (CQIs) and control information related to a CQI for a joint transmission of at least two cells; and
a controller configured to obtain a data rate receivable by the UE when the at least two cells simultaneously transmit, based on the determined CQIs and the control information,
wherein the control information comprises a relative value indicating a difference between the data rate receivable by the UE when the at least two cells simultaneously transmit and a data rate corresponding to a greatest CQI among the determined CQIs.

14. The apparatus of claim 13, wherein the relative value is determined by a following equation, $$\Delta_{CQI} = CQI_{JT} - \max(CQI_1, \ldots, CQI_N)$$

where $\Delta_{CQI}$ denotes the relative value, N is a number of the at least two cells involved in the joint transmission, $CQI_{JT}$ denotes the data rate receivable by the UE when the at least two cells simultaneously transmit, and $\max(CQI_1, CQI_N)$ denotes the greatest CQI among the at least two CQIs for each of the at least two cells.

15. The apparatus of claim 13, wherein the feedback information further comprises rank indicators (RIs) and precoding matrix indicators (PMIs) for the each of the at least two cells, and
wherein the RIs and the PMIs are determined based on the CSI-RS and the configuration information related to the CSI feedback.

16. The apparatus of claim 15, wherein an RI for the at least two cells is determined based on a smallest RI of the RIs for the each of the at least two cells.

17. The apparatus of claim 16, wherein the controller combines partial columns from precoding matrices indicated by the PMIs for the each of the at least two cells based on the determined RI when the RIs for the each of the at least two cells are different.

* * * * *